(12) United States Patent
Ren et al.

(10) Patent No.: US 12,295,350 B1
(45) Date of Patent: May 13, 2025

(54) GRAIN DELIVERY DEVICE OF A BIRD FEEDER

(71) Applicant: NETVUE TECHNOLOGIES CO., LTD., Shenzhen (CN)

(72) Inventors: Yucheng Ren, Shenzhen (CN); Rui Zhang, Shenzhen (CN); Youle Hu, Shenzhen (CN); Chuan Chen, Shenzhen (CN)

(73) Assignee: NETVUE TECHNOLOGIES CO., LTD., Nanshan District (CN)

( * ) Notice: Subject to any disclaimer, the term of this patent is extended or adjusted under 35 U.S.C. 154(b) by 0 days.

(21) Appl. No.: 18/785,823

(22) Filed: Jul. 26, 2024

(30) Foreign Application Priority Data

Feb. 28, 2024 (CN) .......................... 202410221876.2

(51) Int. Cl.
*A01K 39/012* (2006.01)
(52) U.S. Cl.
CPC .................................. *A01K 39/012* (2013.01)
(58) Field of Classification Search
CPC .... A01K 39/01; A01K 39/012; A01K 39/014; A01K 39/0125
See application file for complete search history.

(56) References Cited

U.S. PATENT DOCUMENTS

| | | | | |
|---|---|---|---|---|
| 4,690,101 A | * | 9/1987 | Kilham | A01K 39/012 119/52.2 |
| 2015/0342154 A1 | * | 12/2015 | DiOrio | C11D 3/30 119/52.2 |
| 2020/0000067 A1 | * | 1/2020 | Chi | A01K 39/0113 |

FOREIGN PATENT DOCUMENTS

| | | | | | |
|---|---|---|---|---|---|
| CN | 108901886 A | * | 11/2018 | | |
| CN | 110574700 A | * | 12/2019 | | |
| CN | 112293280 A | * | 2/2021 | ............. | A01K 39/01 |
| CN | 114946705 A | * | 8/2022 | ......... | A01K 39/0125 |
| CN | 107372191 B | * | 1/2024 | ......... | A01K 39/0106 |

* cited by examiner

*Primary Examiner* — Monica L Perry
*Assistant Examiner* — Aaron M Rodziwicz

(57) ABSTRACT

A grain delivery device of a bird feeder, including a feeding tray and a driver, wherein the feeding tray is provided with an assembly hole, the bottom of the feeding tray is provided with a grain storage cylinder, the grain storage cylinder is provided with a grain outlet connected with the assembly hole, and the grain storage cylinder is provided with a pushing piece; the driver is used for driving the pushing piece to push out the bird feed contained in the grain storage cylinder from the grain outlet.

15 Claims, 5 Drawing Sheets

GRAIN DELIVERY DEVICE OF A BIRD FEEDER

CROSS-REFERENCE TO RELATED APPLICATIONS

The application claims priority of Chinese patent application CN2024102218762, filed on Feb. 28, 2024, which is incorporated herein by reference in its entireties.

TECHNICAL FIELD

The present invention relates to the technical field of bird feeder, in particular to a grain delivery device of a bird feeder.

BACKGROUND

Bird feeder is a device used to attract and feed birds in the surrounding area, which is widely preferred by bird lovers or scientific researchers. The bird feeder mainly includes a feeding tray and a grain storage container for storing bird food. The grain storage container is usually arranged above the feeding tray. Although the bird food inside the grain storage container can flow to the feeding tray under the action of gravity, the grain storage container blocks part of the field of vision, hindering the convenient observation and photographing by bird enthusiasts or scientific researchers; and grain delivery relying on gravity may cause the problems of unstable and hindrance of grain delivery. There is an urgent need to solve the above problems.

SUMMARY

Accordingly, the main object of the present invention is to provide a grain delivery device of a bird feeder in order to overcome the above challenges.

The present invention realizes the above purpose through the following technical proposal: a grain delivery device of a bird feeder comprises a feeding tray and a driver, wherein the feeding tray is provided with an assembly hole, and the bottom of the feeding tray is provided with a grain storage cylinder; the grain storage cylinder is provided with a grain delivery outlet connected with the assembly hole, and the grain storage cylinder is provided with a pushing piece;

the driver is used for driving the pushing piece to push out the bird food contained in the grain storage cylinder from the grain outlet;

further, the top end of the grain storage cylinder passes through the assembly hole and protrudes from the feeding tray and the top periphery of the grain storage cylinder is sleeved with an annular conical table; it enables the bird food to flow to the feeding plate evenly and avoids piling up;

further, the grain storage cylinder is provided with a detection mechanism for detecting the stock of bird food; it allows users to track the stock of bird food, and to replenish bird food timely;

further, the pushing piece is slidably sealed in the grain storage cylinder, and the driver comprises an air pump and a control valve, and the control valve communicates between the bottom of the grain storage cylinder and the air pump; the structure is relatively simple, and realizes the sliding of the pushing piece in the grain storage cylinder, so as to push out the bird food contained in the grain storage cylinder from the grain outlet;

further, the pushing piece and the bottom end of the grain storage cylinder cooperate to form a pushing chamber, the air pump is electrically connected with an air pressure sensor, and the detection end of the air pressure sensor is arranged in the pushing chamber;

further, the driver comprises a controller; the air pump and the air pressure sensor are electrically connected to the controller respectively, and the controller controls the air pump to work or stop; the air pressure sensor detects the air pressure value in the pushing chamber and feeds back to the controller; the controller converts the air pressure value into a weight value, and based on which, the controller judges whether to send out a signal for replenishing bird food; the weight value can be reflected by the air pressure value, and the bird food in the grain storage cylinder can be weighed; the structure is relatively simpler and more intelligent;

further, it also includes a one-way opening and closing mechanism for opening and closing the grain outlet;

further, the one-way opening and closing mechanism comprises a support frame connected to the grain outlet; a cover plate is slidably connected on the support frame, and the cover plate is arranged opposite to the grain outlet; the size of the cover plate is equal to or larger than the diameter of the grain outlet; when there is no need to replenish the bird food on the feeding tray, the grain outlet can be closed to prevent birds from directly pecking food in the grain storage cylinder, and the normal grain delivery from the grain outlet is supported;

further, the one-way opening and closing mechanism comprises a diverter cylinder connected to the grain outlet; a plurality of grain distribution ports are provided on the side wall of the diverter cylinder along the circumferential direction, and a plurality of one-way doors corresponding to the plurality of grain distribution ports are provided on the diverter cylinder; and the top end of the one-way door is rotatably connected with the diverter cylinder, and the bottom end of the one-way door is matched with the outside stop of the diverter cylinder; when there is no need to replenish the bird food on the feeding tray, the grain outlet can be closed to prevent birds from directly pecking the bird food in the grain storage cylinder, and the normal grain delivery from the grain outlet is supported;

further, the top of the diverter cylinder is provided with a stopper edge, and the diameter of the stopper edge is greater than that of the diverter cylinder; it can shield the grain distribution port from wind and rain, prevent liquid and impurities from entering the grain storage drum, and prevent bird food from deteriorating quickly.

The beneficial effect of the present invention lie in that: firstly, the grain storage cylinder is arranged at the bottom of the feeding tray, which provides an open field of vision, and facilitates the observation and photographing of bird lovers or scientific researchers; secondly, driven by the driver, the pushing piece can push out the bird food contained in the grain storage cylinder from the grain outlet, realizing automatic grain delivery; the structure is relatively simple and intelligent, and it is relatively convenient to replenish bird food to the feeding tray, thereby solving the technical problems in the prior art. In summary, the present invention has the advantages of simple structure, convenient grain delivery and relative intelligence, and can provide an open field of vision to facilitate observation and photographing.

BRIEF DESCRIPTION OF THE DRAWINGS

Markings of drawings are as follows: 1. Feeding tray; 11. Assembly hole; 2. Driver; 21. Air pump; 22. Control valve.

23. Air pressure sensor; 24. Controller; 3. Grain storage cylinder; 31. Grain outlet; 4. Pushing piece; 5. Annular conical table; 6. One-way opening and closing mechanism; 601. Support frame; 6011. Sliding hole; 602. Cover plate; 6021. Sliding rod; 603. Stop block; 611. Diverter cylinder; 6111. Grain distribution port; 612. One-way door; 613. Stopper edge; 7. Pushing chamber.

EMBODIMENTS

For a fuller understanding of the nature and objects of the present invention, the accompanying drawings and embodiments are referred to give a detailed description. It should be noted that when an element is expressed as "fixed" to another element, it may be directly on the other element, or there may be one or more centered elements in between. When an element is expressed as "connected" to another element, it may be directly connected to the other element, or there may be one or more centered elements in between. The terms "up", "down", "left", "right", "inside", "outside" and similar expressions used herein are for illustrative purposes only.

Unless otherwise defined, all technical and scientific terms used herein have the same meanings as those skilled in the art of the present invention would normally understand. The terms used herein in the descriptions are intended to illustrate particular embodiments and do not limit the scope of the present invention. The term "and/or" used herein includes any and all combinations of one or more related listed items.

Embodiment 1

Figure 1:
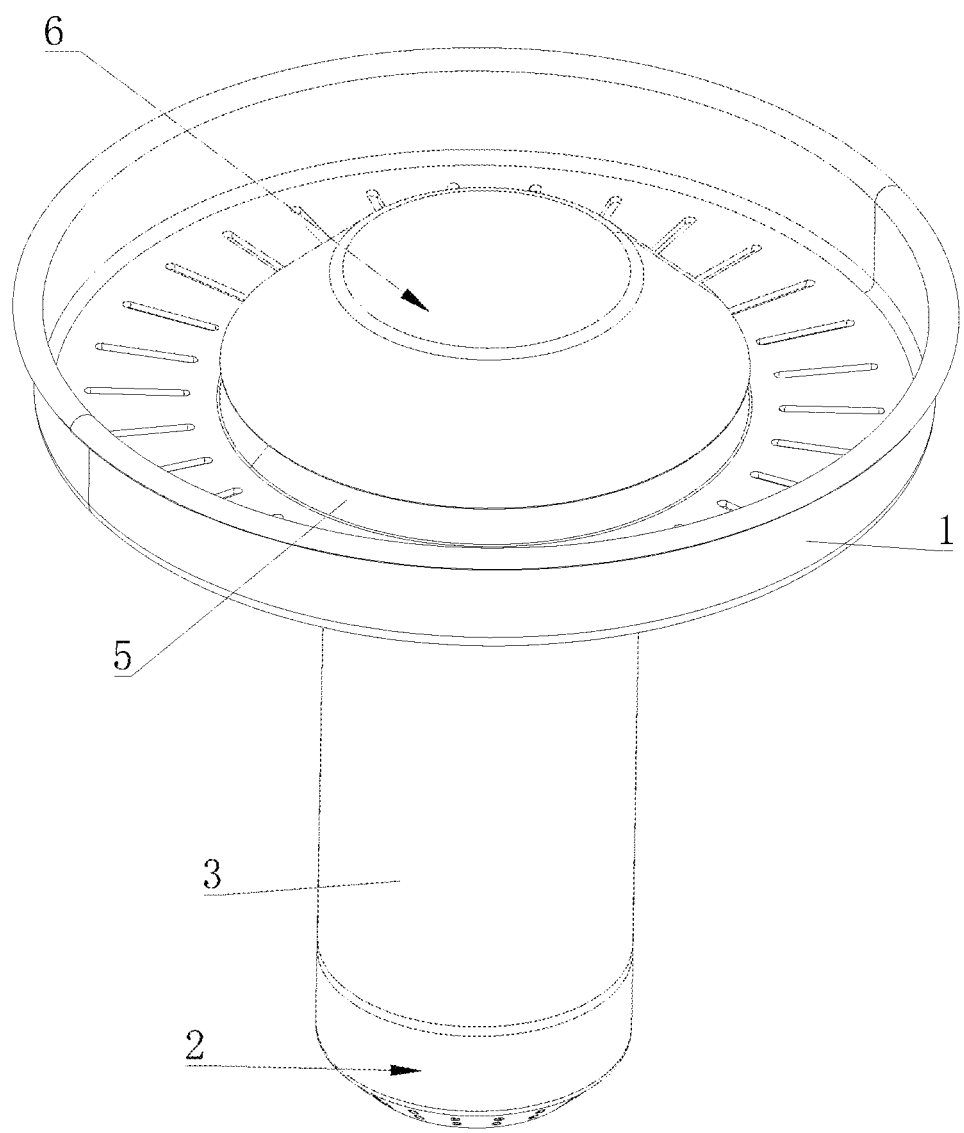
FIG. 1 is an overall view of the embodiment 1 of the present invention.
Figure 2:
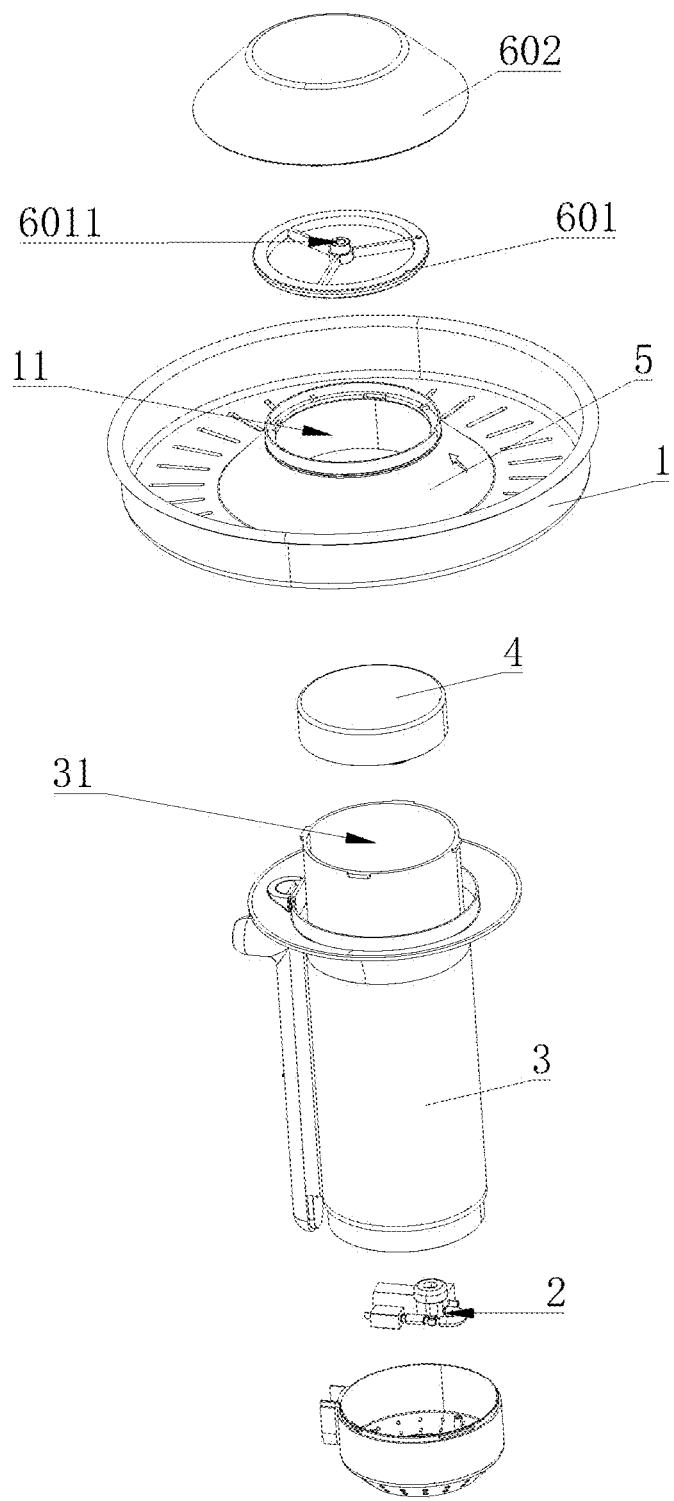
FIG. 2 is an cross-sectional view of the embodiment 1 of the present invention.
Figure 3:
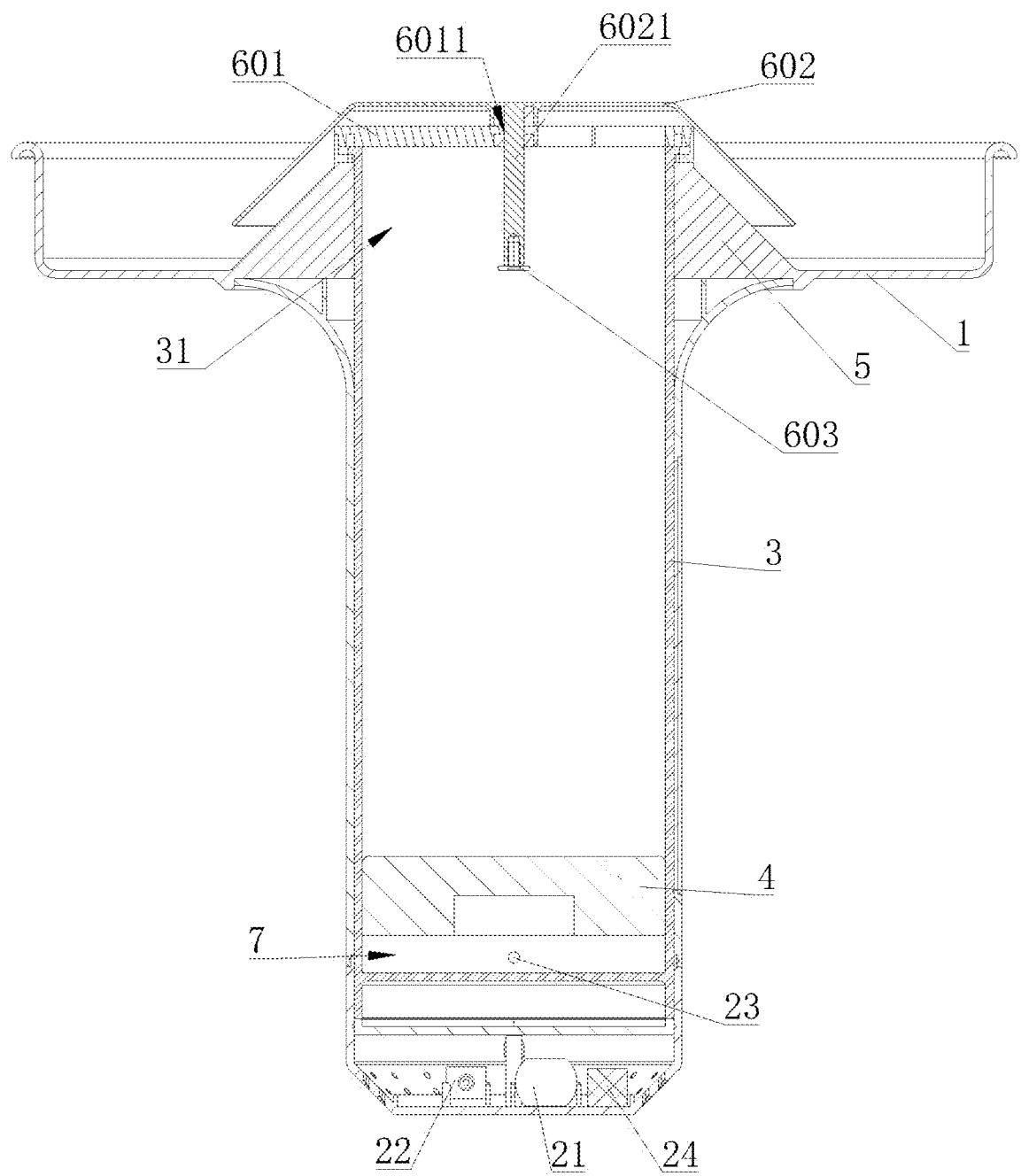
FIG. 3 is an exploded view of the embodiment 1 of the present invention.

As shown in FIG. 1 and FIG. 3, the present embodiment provides a grain delivery device of a bird feeder, comprising a feeding tray 1 and a driver 2; the feeding tray 1 is provided with an assembly hole 11, and set with a grain storage cylinder 3 provided at the bottom; the grain storage cylinder 3 is provided with a grain outlet 31 communicating the assembly hole 11, and a pushing piece 4 inside.

The driver 2 is used to drive the pushing piece 4 to push out the bird food contained in the grain storage cylinder 3 from the grain outlet 31.

The top end of the grain storage cylinder 3 passes through the assembly hole 11 and protrudes from the feeding tray 1, and the top periphery of the grain storage cylinder 3 is sleeved with an annular conical table 5. Specifically, the height of the grain outlet 31 is higher than that of the assembly hole 11, so that the top end of the grain storage cylinder 3 protrudes from the feeding tray 1, allowing the bird food flowing out of the grain outlet 31 and to be diverge to the feeding tray 1; as a result, the grain delivery is more even, and avoided grain piling up. Preferably, the assembly hole 11 is arranged in the center of the feeding tray 1, so as to ensure the evenly grain output.

In a preferred embodiment, the grain storage cylinder 3 is equipped with a testing mechanism for detecting the stock of bird food. The testing mechanism can be electrically connected with the intelligent terminal. When the stock is low, the user will be reminded to replenish the bird food. When replenishing the stock, the user will be reminded to stop if the maximum stock has been reached. The detection mechanism may be a pressure sensor provided on the pushing piece 4, which directly detects the weight of the bird food stock, and judges the stock level in the grain storage cylinder 3 according to the weight; it may also be a photoelectric sensor provided at the upper and lower ends of the grain storage cylinder 3, and detects the capacity to judge the stock in the grain storage cylinder 3. For the purpose of replenishing bird food in the feeding tray 1, a timing grain delivery program can be provided that make the grain delivery to the feeding tray 1 through the action of the driver 2 at the set time node; or, by using image recognition technology, the bird food consumption in the feeding tray 1 can be recognized and judged, and when the feeding tray 1 is detected to be or close to be empty, the driver 2 will operate to replenish the bird food on the feeding tray 1.

The pushing piece 4 and the bottom end of the grain storage cylinder 3 cooperate to form a pushing chamber 7, and the air pump 21 is electrically connected with an air pressure sensor 23, and the detecting end of the air pressure sensor 23 is provided in the pushing chamber 7. The driver 2 also includes a controller 24. The air pump 21 and the air pressure sensor 23 are electrically connected to the controller 24. The controller 24 controls the air pump 21 to work or stop, the air pressure sensor 23 detects the air pressure value in the pushing chamber 7 and feeds back to the controller 24. The controller 24 then converts the air pressure value into a weight value, and based on which, the controller 24 judges whether to send out a signal to replenish bird food based on the weight value.

Specifically, the controller 24 controls the operation of the air pump 21 to fill air into the pushing chamber 7, so that the lifting height of the pushing piece 4 is H. At this time, the air pressure sensor 23 detects the air pressure value in the pushing chamber 7 and feeds back to the controller 24. The controller 24 converts the air pressure value into a weight value, and based on which, the controller 24 determines whether to send out a signal for replenishing bird food; a weight value range is preset, when the actual feedback weight value falls into the range of the weight values, the signal for replenishing bird food is sent to the intelligent terminal. For the detection of height H, a photoelectric sensor may be fixed at a certain position on the inner wall of the grain storage cylinder 3, or a movement sensor may be provided on the pushing piece 4 to detect its actual moving height, which is the height H.

It is worth mentioning that the air pressure sensor 23 cooperates with the controller 24 to realize the purpose of detecting the stock of bird food by the detection mechanism. The detection mechanism and the air pressure sensor 23 can be arranged at the same time to realize multiple-level detection, so that the determination of the bird food stock is more accurate.

The pushing piece 4 is slidably sealed in the grain storage cylinder 3, and the driver 2 includes the air pump 21 and the control valve 22; the control valve 22 communicates between the bottom of the grain storage cylinder 3 and the air pump 21. Specifically, the shape of the pushing piece 4 is adapted to the inner wall of the grain storage cylinder 3 to ensure the slidably sealing fit of the pushing piece 4. The pushing piece 4 divides the inner chamber of the grain storage cylinder 3 into an upper chamber and a lower chamber. The upper chamber is filled with bird food, and the control valve 22 communicates with the lower chamber, which is the pushing chamber 7. In operation, the air pump 21 is activated, and the gas is filled into the lower chamber through the control valve 22, thereby pushing the pushing piece 4 to slide upwards away from the bottom surface of the grain storage cylinder 3, so that the bird food is pushed out from the grain outlet 31. At this time, the control valve 22 is equivalent to a one-way valve, and the gas can only flow to the lower chamber. After replenishing the bird food, the control valve 22 is reversed to discharge the gas in the lower chamber, so that the pushing piece 4 moves downwards to stay against the bottom surface of the grain storage cylinder 3. The bird food will not always pile up at the grain outlet 31, so that birds are prevented from directly pecking the bird food in the grain storage cylinder 3. It should be noted that the driver 2 may also be an air cylinder, a hydraulic cylinder, or other driving mechanism, so that the pushing piece 4 can be moved along the axial direction of the grain storage cylinder 3 to push out bird food, and the structure of which will not be described in details herein. Of course, the pushing piece 4 can also be a spiral feeding rod, and the driver 2 can be a motor, which can also achieve the purpose of feeding bird food, and the structure of which will not be described in details herein.

The present invention also includes a one-way opening and closing mechanism 6 for opening and closing the grain outlet 31. The one-way opening and closing mechanism 6 includes a support frame 601 connected to the grain outlet 31. The support frame 601 is slidably connected with a cover plate 602 that is arranged opposite to the grain outlet 31. The size of the cover plate 602 is equal to or larger than the diameter of the grain outlet 31. Specifically, the support frame 601 is provided with a sliding hole 6011, the cover plate 602 is provided with a protruding sliding rod 6021 that slides and cooperates with the sliding hole 6011. The sliding rod 6021 is extended along the axial direction of the grain outlet 31, and the end of the sliding rod 6021 is provided with a stop block 603 that stops and cooperates with the support frame 601. Under normal circumstances, the cover plate 602 closes the grain outlet 31 under the action of gravity, so as to prevent birds from pecking the food in the grain storage cylinder 3. When the bird food is pushed upwards, the cover plate 602 is pushed upwards, and the sliding rod 6021 slides relative to the sliding hole 6011 until the stop block 603 is against the support frame 601, and the bird food can flow out of the grain outlet 31 smoothly to replenish to the feeding tray 1.

Example 2

Figure 4:
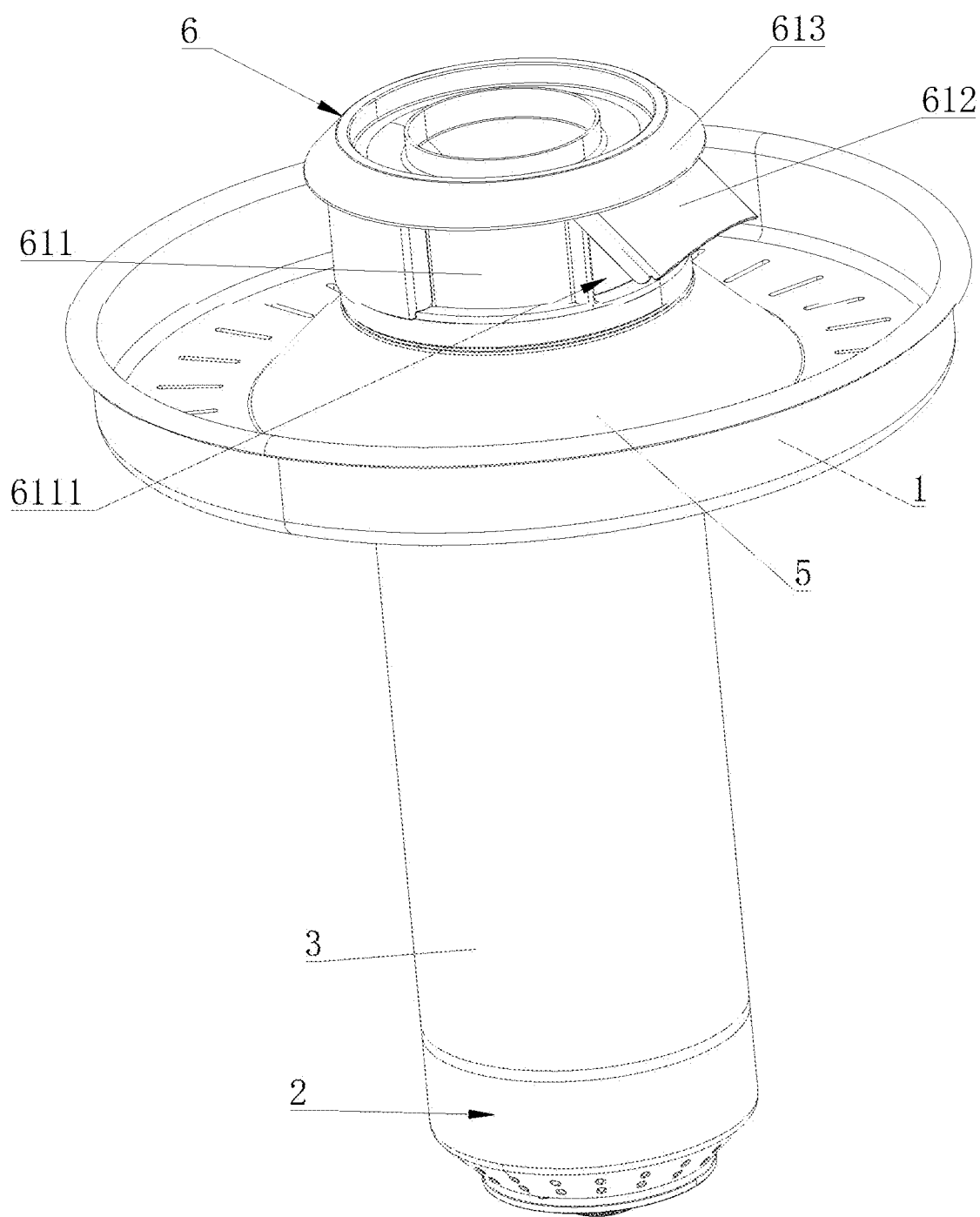
FIG. 4 is an overall view of the embodiment 2 of the present invention.
Figure 5:
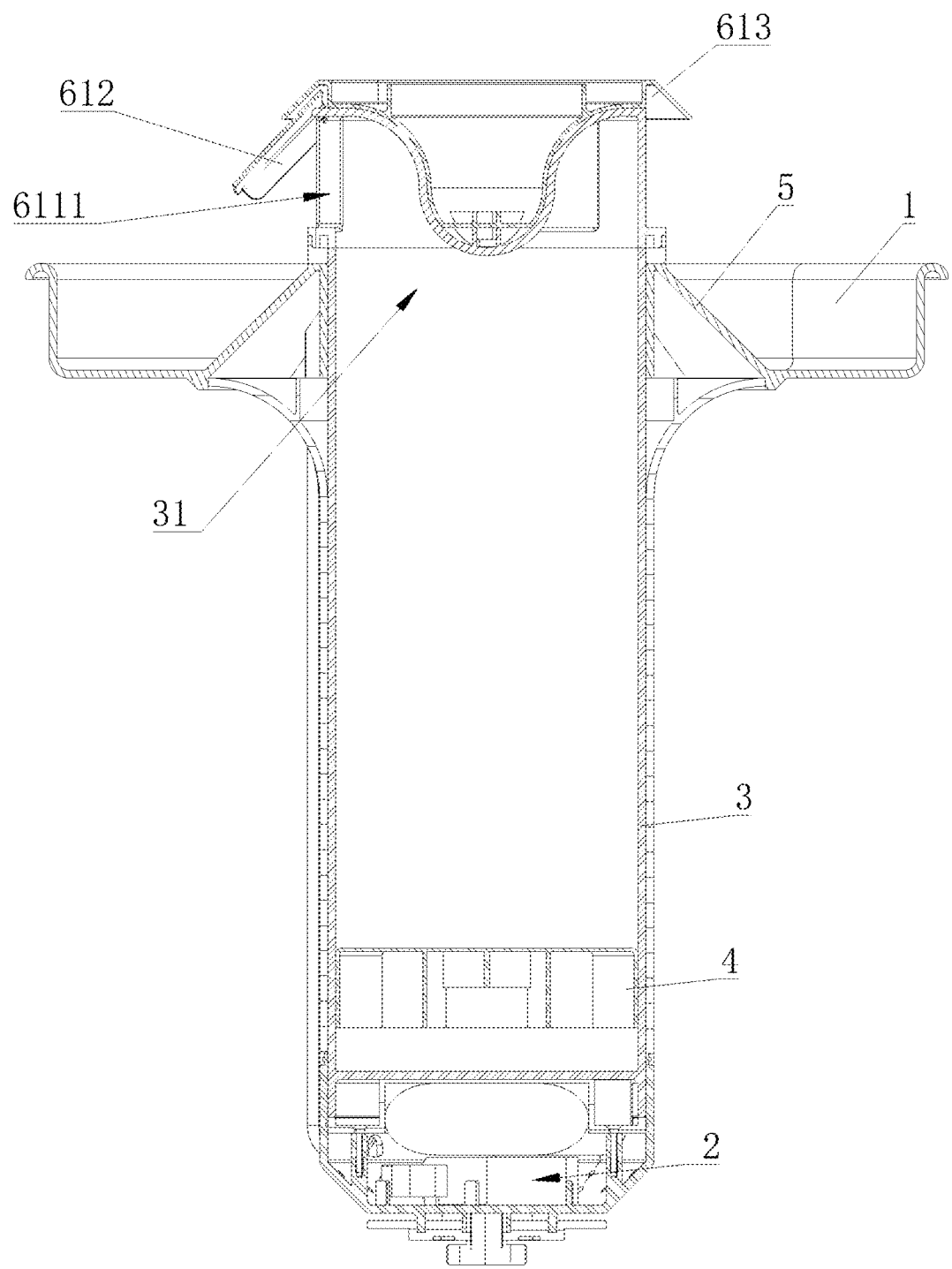
FIG. 5 is an cross-sectional view of the embodiment 2 of the present invention.

Referring to FIG. 4 and FIG. 5, the one-way opening and closing mechanism 6 includes a diverter cylinder 611 connected to the grain outlet 31. A plurality of grain distribution ports 6111 are provided on the side wall of the diverter cylinder 611 in the circumferential direction, and a plurality of one-way doors 612 corresponding to the plurality of grain distribution ports 6111 are provided on the diverter cylinder 611. The top end of the one-way door 612 is rotatably connected with the diverter cylinder 611, and the bottom end of the one-way door 612 cooperates with the outside stop of the diverter cylinder 611. A stopper edge 613 is provided at the top of the diverter cylinder 611, and the diameter of the stopper edge 613 is larger than that of the diverter cylinder 611. Under normal circumstances, the one-way door 612 closes the grain distribution port 6111 under the action of gravity, which can also prevent birds from pecking bird food in the grain storage cylinder 3. When the bird food is pushed upward, the bird food passes through the grain outlet 31, and then flows to the grain distribution port 6111, so that the one-way door 612 is opened and the bird food can flow out smoothly to replenish the feeding tray 1.

While the basic principles, main features and advantages of the present invention are shown and described above, it should be understood that various other alternatives, modifications and equivalents of the present invention can be made by those persons who are particularly skilled in the art without departing from either the spirit of the present invention or the scope of the appended claims.

What is claimed is:

1. A grain delivery device of a bird feeder, comprising a feeding tray (1) and a driver (2), wherein the feeding tray (1) is provided with an assembly hole (11), a grain storage cylinder (3) is provided at a bottom of the feeding tray (1), the grain storage cylinder (3) is provided with a grain outlet (31) communicating with the assembly hole (11), and a pushing piece (4) is provided in the grain storage cylinder (3);

the driver (2) is configured to drive the pushing piece (4) to work, so as to push out a bird food contained in the grain storage cylinder (3) from the grain outlet (31);

wherein the pushing piece (4) is slidably sealed in the grain storage cylinder (3), and the driver (2) comprises an air pump (21) and a control valve (22), wherein the control valve (22) communicates between a bottom of the grain storage cylinder (3) and the air pump (21); a pushing chamber (7) is formed by matching the pushing piece (4) and a bottom end of the grain storage cylinder (3); the air pump (21) is configured to pump air into the pushing chamber (7) to push the pushing piece (4) to slide upwards away from a bottom surface of the grain storage cylinder (3).

2. The grain delivery device of a bird feeder according to claim 1, wherein a top end of the grain storage cylinder (3) passes through the assembly hole (11) and protrudes from the feeding tray (1), and a top periphery of the grain storage cylinder (3) is sleeved with an annular conical table (5).

3. The grain delivery device of a bird feeder according to claim 1, wherein the grain storage cylinder (3) is provided with a detection mechanism for detecting a stock of the bird food.

4. The grain delivery device of a bird feeder according to claim 1, wherein the air pump (21) is electrically connected with an air pressure sensor (23), and the detection end of the air pressure sensor (23) is arranged in the pushing chamber (7).

5. The grain delivery device for a bird feeder according to claim 4, wherein the driver (2) further comprises a controller (24); the air pump (21) and the air pressure sensor (23) are respectively electrically connected to the controller (24); the controller (24) controls the air pump (21) to work or stop, and the air pressure sensor (23) detects an air pressure value in the pushing chamber (7) and feeds back the air pressure value to the controller (24); the controller (24) converts the air pressure value into a weight value, and based on which, the controller (24) judges whether to issue a signal to replenish the bird food.

6. The grain delivery device of a bird feeder according to claim 5, further comprising an one-way opening and closing mechanism (6) for opening and closing the grain outlet (31).

7. The grain delivery device of a bird feeder according to claim 6, wherein the one-way opening and closing mechanism (6) comprises a support frame (601) connected to the grain outlet (31), a cover plate (602) is slidably connected to the support frame (601), the cover plate (602) is arranged opposite to the grain outlet (31), and a size of the cover plate (602) is equal to or larger than a diameter of the grain outlet (31).

8. The grain delivery device of a bird feeder according to claim 6, wherein the one-way opening and closing mechanism (6) comprises a diverter cylinder (611) connected to the grain outlet (31), a plurality of grain distribution ports (6111) are provided on a side wall of the diverter cylinder (611) along a circumferential direction, a plurality of one-way doors (612) corresponding to the plurality of grain distribution ports (6111) are provided on the diverter cylinder (611); and a top end of the one-way door (612) is rotatably connected with the diverter cylinder (611), and a bottom end of the one-way door (612) is matched with an outside stop of the diverter cylinder (611).

9. The grain delivery device of a bird feeder according to claim 8, wherein a top of the diverter cylinder (611) is provided with a stopper edge (613), whose diameter is larger than that of the diverter cylinder (611).

10. A grain delivery device of a bird feeder, comprising
a feeding tray (1) and
a driver (2), wherein the feeding tray (1) is provided with an assembly hole (11), a grain storage cylinder (3) is provided at a bottom of the feeding tray (1), the grain storage cylinder (3) is provided with a grain outlet (31) communicating with the assembly hole (11), and a pushing piece (4) is provided in the grain storage cylinder (3);
the driver (2) is configured to drive the pushing piece (4) to work, so as to push out a bird food contained in the grain storage cylinder (3) from the grain outlet (31);
wherein the pushing piece (4) is slidably sealed in the grain storage cylinder (3), and the driver (2) comprises an air pump (21) and a control valve (22), wherein the control valve (22) communicates between the bottom of the grain storage cylinder (3) and the air pump (21);
wherein a pushing chamber (7) is formed by matching the pushing piece (4) and the bottom end of the grain storage cylinder (3), and the air pump (21) is electrically connected with an air pressure sensor (23), and the detection end of the air pressure sensor (23) is arranged in the pushing chamber (7).

11. The grain delivery device for a bird feeder according to claim 10, wherein the driver (2) further comprises a controller (24); the air pump (21) and the air pressure sensor (23) are respectively electrically connected to the controller (24); the controller (24) controls the air pump (21) to work or stop, and the air pressure sensor (23) detects an air pressure value in the pushing chamber (7) and feeds back the air pressure value to the controller (24); the controller (24) converts the air pressure value into a weight value, and based on which, the controller (24) judges whether to issue a signal to replenish the bird food.

12. The grain delivery device of a bird feeder according to claim 11, further comprising an one-way opening and closing mechanism (6) for opening and closing the grain outlet (31).

13. The grain delivery device of a bird feeder according to claim 12, wherein the one-way opening and closing mechanism (6) comprises a support frame (601) connected to the grain outlet (31), a cover plate (602) is slidably connected to the support frame (601), the cover plate (602) is arranged opposite to the grain outlet (31), and a size of the cover plate (602) is equal to or larger than a diameter of the grain outlet (31).

14. The grain delivery device of a bird feeder according to claim 12, wherein the one-way opening and closing mechanism (6) comprises a diverter cylinder (611) connected to the grain outlet (31), a plurality of grain distribution ports (6111) are provided on a side wall of the diverter cylinder (611) along a circumferential direction, a plurality of one-way doors (612) corresponding to the plurality of grain distribution ports (6111) are provided on the diverter cylinder (611); and a top end of the one-way door (612) is rotatably connected with the diverter cylinder (611), and a bottom end of the one-way door (612) is matched with an outside stop of the diverter cylinder (611).

15. The grain delivery device of a bird feeder according to claim 14, wherein a top of the diverter cylinder (611) is provided with a stopper edge (613), whose diameter is larger than that of the diverter cylinder (611).

* * * * *